UNITED STATES PATENT OFFICE.

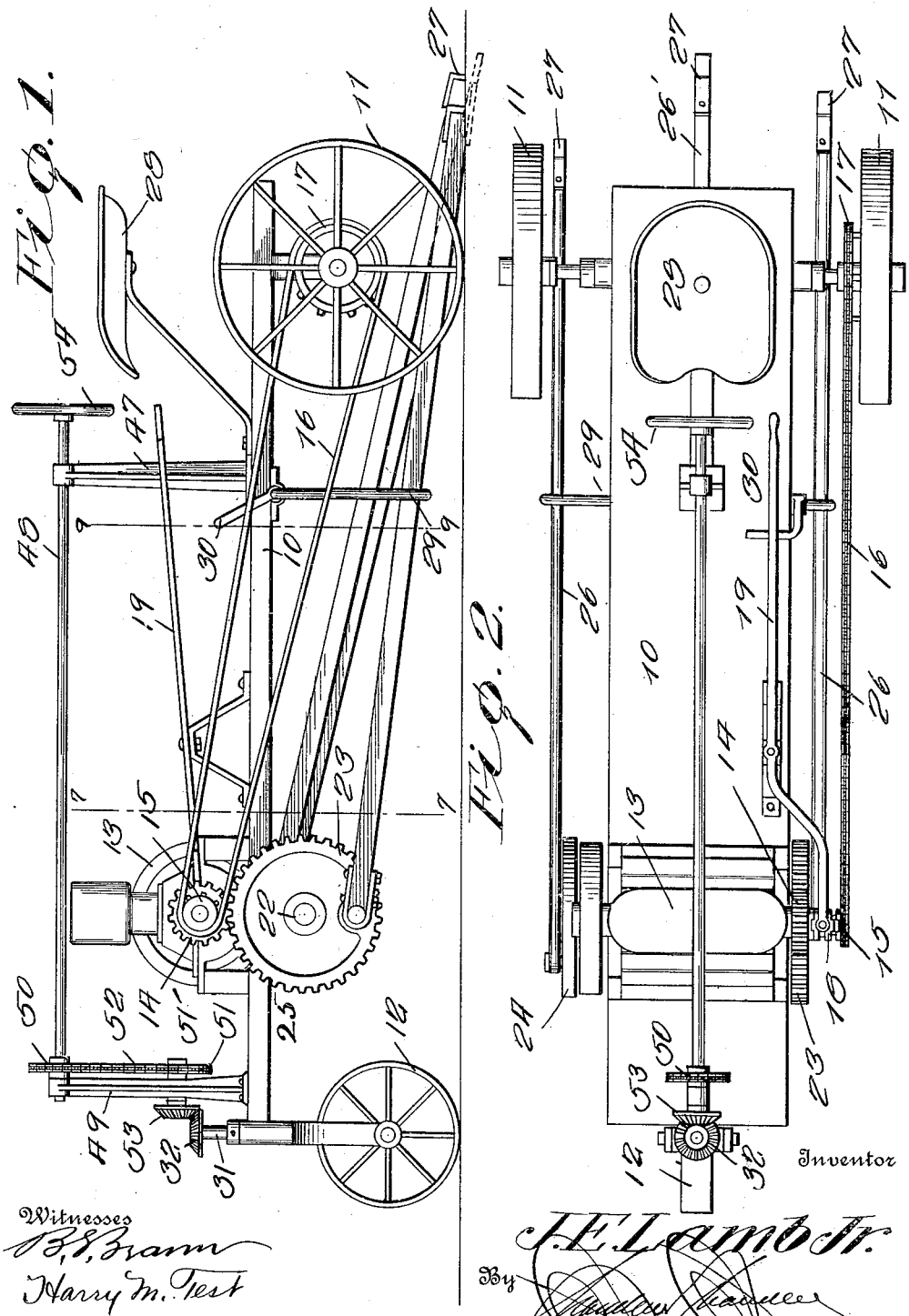

JOSEPH E. LAMB, JR., OF LEWISTOWN, MONTANA.

TRACTOR.

1,126,034.  Specification of Letters Patent.  Patented Jan. 26, 1915.

Application filed January 22, 1913. Serial No. 743,623.

*To all whom it may concern:*

Be it known that I, JOSEPH E. LAMB, Jr., a citizen of the United States, residing at Lewistown, in the county of Fergus, State of Montana, have invented certain new and useful Improvements in Tractors; and I do hereby declare the following to be a full, clear, and exact description of the invention, such as will enable others skilled in the art to which it appertains to make and use the same.

This invention relates to improvements in agricultural implements, and has particular reference to a propelling device therefor.

The principal object of the invention is to provide a simple device of this character that can be substituted for the horse and the large traction engine used to propel farm or other machinery, at little expense.

Other objects and advantages will be apparent from the following description and with particular reference to the accompanying drawings.

In the drawings: Figure 1 is a side elevation of a propelling machine made in accordance with my invention, Fig. 2 is a top plan view.

Referring particularly to Figs. 1 and 2 of the accompanying drawings, 10 represents a beam, the rear end of which is supported by the ground engaging wheels 11.

On the forward portion of the beam is mounted a caster wheel 12 which supports the forward end of the beam.

Slightly in the rear of the caster wheel 12 is a gasolene or other motor 13, on the shaft of which is keyed a pinion 14, this pinion having a clutch face on its inner side. Also loosely mounted on the shaft is a sprocket wheel 15 which drives the ground engaging wheels by means of the chain 16 and sprocket wheel 17 on the axle of the wheels 11. Keyed to the shaft of the engine between the pinion 14 and the sprocket wheel 15 is a double faced sliding clutch collar 18 which is adapted to be shifted on the shaft by means of the lever 19, which is pivotally mounted on the beam.

Arranged below the engine, and under the beam, is a transverse shaft 22 on which are mounted the disks 23 and 24, the former of which has geared teeth 25 which mesh with the pinion 14, and by means of which the shaft is rotated.

Pivoted eccentrically on the disks 23 and 24 are the pusher rods 26 which extend to the rear of the machine beyond the wheels 11, where their terminal ends have secured thereto the metal ground engaging shoes 27.

A crank 22′ is formed in the shaft 22, and carries a third and centrally arranged pusher rod 26′.

Mounted on the beam is the usual driver's seat 28.

Below the seat and secured to the beam 10 is a looped bracket 29, which supports the pusher rods 26 as shown. The bracket 29 is vertically adjustable, and is raised and lowered by means of the lever 30, so that the pusher rods may be raised and lowered away from and toward the ground. When the lever 19 is moved in one direction, the clutch collar will be shifted to engage one of its faces with the clutch face of the sprocket wheel 15, and cause the machine to be driven by the wheels 11. When the machine is propelled by the pushers, the lever 19 is shifted to the opposite position which engages the other face of the collar 18, with the face of the pinion 14, so that the sprocket 15 is idle, and the shaft 22 driven. This causes the rotation of the disks 23 and 24 and the operation of the pusher rods 26 which engage in the ground successively and push the machine along.

Connected to the vertical shaft 31 of the caster wheel 12 is a bevel pinion 32.

Adjacent the seat 28 is a vertical standard 47, which supports the rear end of a rod 48. The forward end of the rod is supported by the standard 49.

Carried by the forward end of the rod is the sprocket 50 which communicates movement to a shaft 51′, carried by the standard 49 near its lower end, by means of a sprocket 51 and chain 52. This shaft 51′ carries a bevel pinion 53 which meshes with the pinion 32. By means of the hand wheel 54 on the rear end of the rod 48 the rod is rotated to turn the shaft 31 of the caster wheel.

What is claimed is:—

In a driving instrument for agricultural machines, a motor, a sliding clutch on the shaft of the motor, a sprocket wheel loosely mounted on the shaft, a pinion loosely mounted on the shaft, means for shifting the clutch into and out of engagement with the sprocket and pinion, said clutch being splined to the shaft, a shaft below the motor, disks mounted on the ends of the shaft, ground engaging pusher rods pivoted eccentrically on the disks, one of the said disks having gear teeth for intermeshing engagement with the pinion on the motor shaft and means for adjustably supporting the pusher rods, drive wheels supporting said machine, and an operative connection between one of said wheels and said sprocket.

In testimony whereof, I affix my signature, in the presence of two witnesses.

JOSEPH E. LAMB, Jr.

Witnesses:
H. H. OTTMAN,
W. A. HEDGES.

Copies of this patent may be obtained for five cents each, by addressing the "Commissioner of Patents, Washington, D. C."